United States Patent Office 2,911,518
Patented Nov. 3, 1959

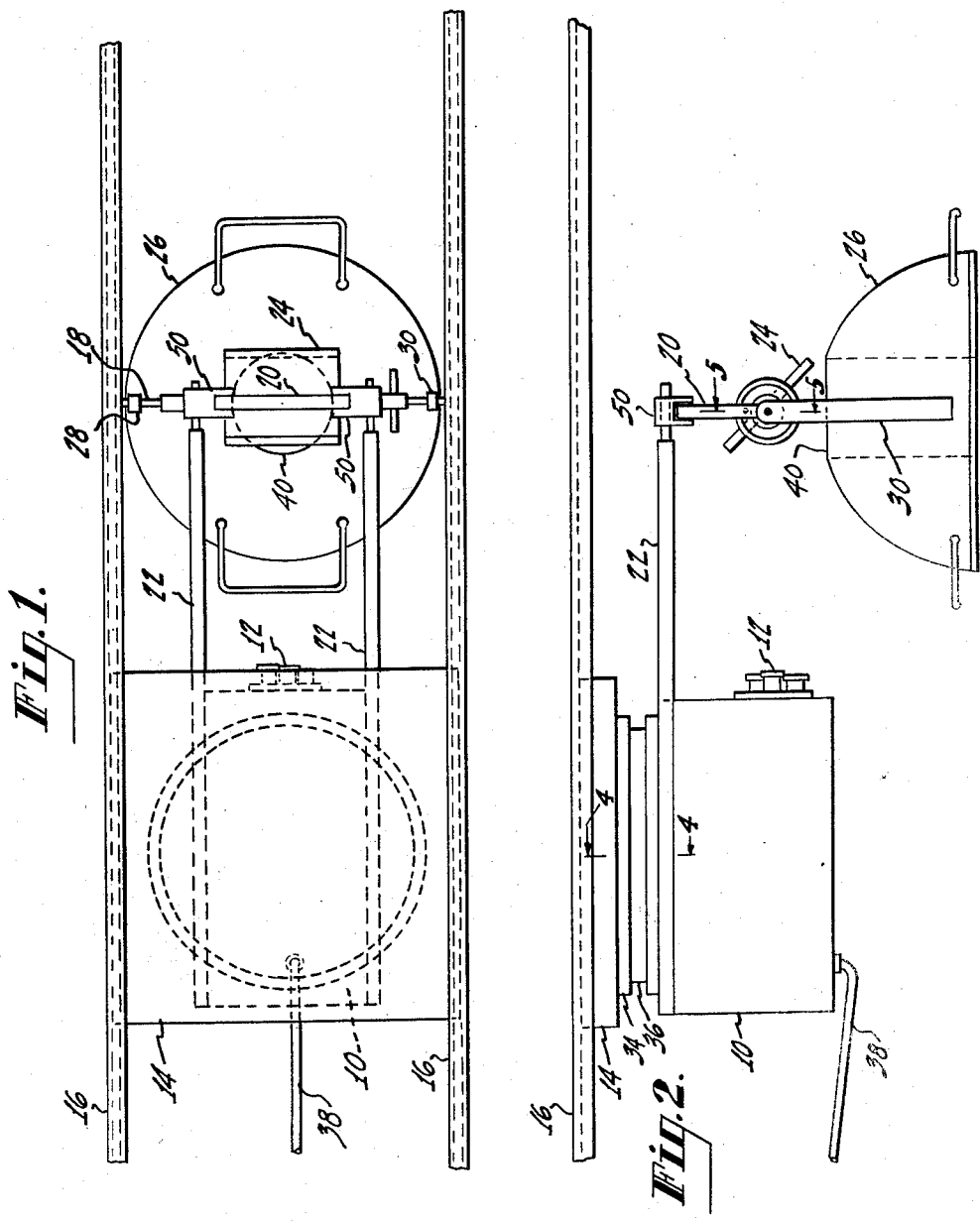

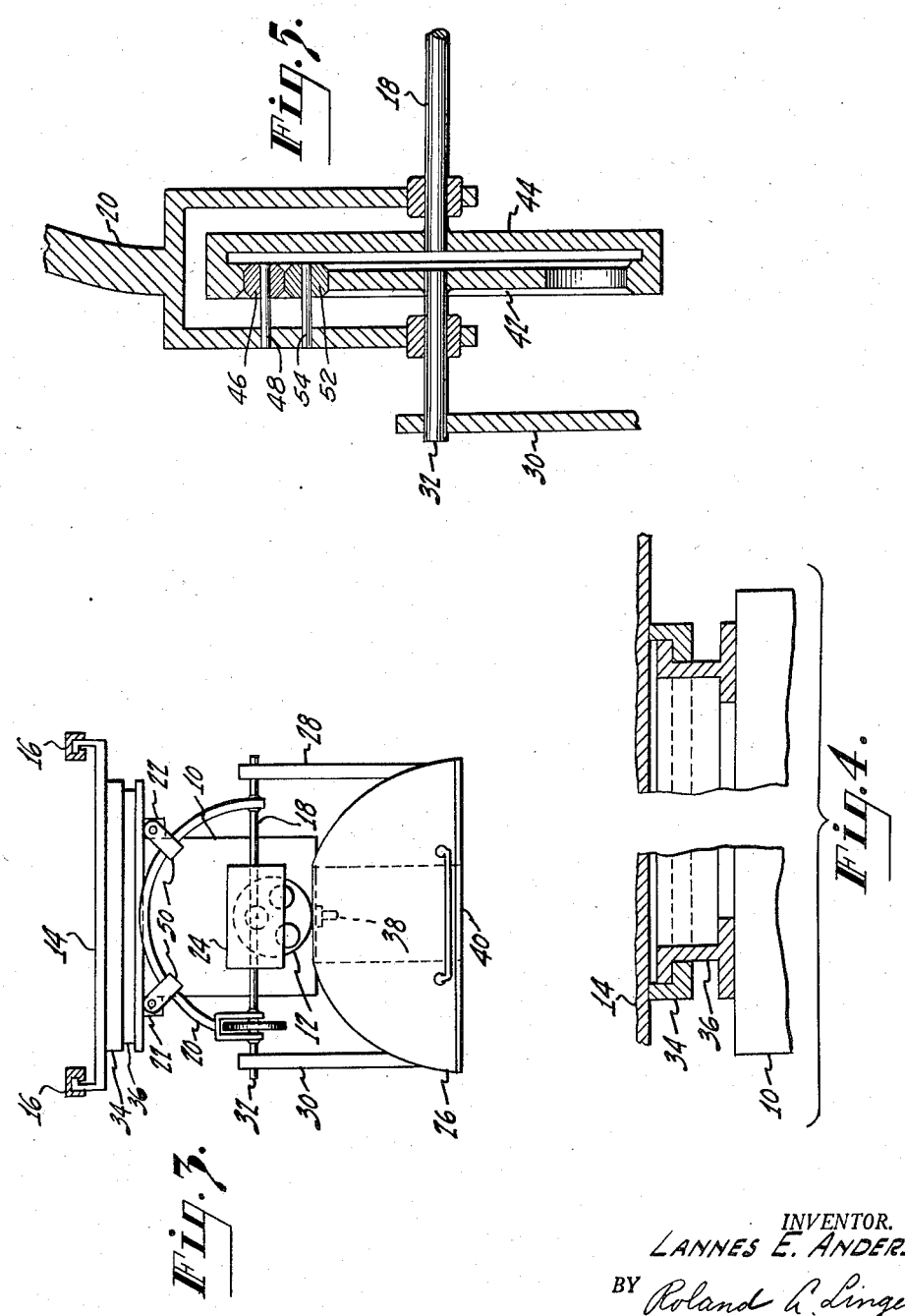

2,911,518

TELEVISION OPTICAL SYSTEM FOR HOSPITAL TELEVISION

Lannes Einride Anderson, Collingswood, N.J., assignor to Radio Corporation of America, a corporation of Delaware Application June 6, 1956, Serial No. 589,778

3 Claims. (Cl. 240—1.3)

My invention relates to a system for viewing surgical operations, and in particular to such a system utilizing a camera in combination with an optical system.

The viewing of surgical techniques by a large audience has heretofore been sharply limited because the seating capacity of operating room amphitheaters is necessarily small. Even in those situations where the amphitheaters have been enlarged to accommodate increased numbers of spectators, only those fortunate enough to be located in the immediate vicinity of the operating table are enabled to follow the details of the operation as it progresses. In the case of delicate brain operations and the like, only those spectators priviledged to stand at the surgeon's side or in a position close to the operating table reap the full benefits of the surgeon's techniques as he progresses with the operation.

Teaching methods in which students observe the steps taken and the method employed by a skilled surgeon as he operates are, of course, of the utmost importance in the medical sciences. All medical students, and particularly potential surgeons, spend many hours as operating room observers. Indeed, even experienced physicians learn new techniques by watching others operate. The undeniable importance of this method as a teaching aid, coupled with the limitations imposed by visual difficulties and limitations in operating room amphitheaters, has for many years posed a problem to the medical profession that has heretofore been without a simple and satisfactory solution.

It is, therefore, an object of my invention to provide improved means for viewing surgical operations in which the number of observers will not be limited by the size of the operating room.

Also, an aim of my invention is to provide a novel pick-up arrangement for operating room use in which all the observers will be given a clear and unobstructed view of the operation as it progresses.

Further, a purpose of my invention is to provide simple means for positioning a camera with an optical system for viewing surgical operations.

A still further purpose is to provide means whereby a camera may be mounted in a horizontal position in a low ceiling room thus gaining additional free space over the operating table.

In general, my invention comprises a light sensitive device, such as a camera, which is suitably supported from the ceiling of the operating room. A reflecting element, located above the operating lamp and table, is so arranged that the positioning of the lamp will simultaneously position both the reflecting element and the camera to provide an optical path from the patient through the lamp to the reflecting element and thence to the particular camera lens being used.

In the practice of my invention, any type of camera or light responsive device may be used to transmit or record the reflected object. For example, a television camera might be used to provide simultaneous transmission of the operation, or a motion picture camera might be employed to record the operation for later viewing. Other methods of transmitting or recording valuable information will be immediately obvious to one skilled in the art.

The foregoing objects, aims, purposes and advantages are accomplished by the structure and arrangement set forth in the following detailed description of one embodiment of my invention, taken in connection with the accompanying drawings, in which:

Fig. 1 is a plan view of the chosen embodiment of my device;

Fig. 2 is a side view of the same device;

Fig. 3 is an end view of the same device;

Fig. 4 is an enlarged cross-section of the camera support assembly taken along the line 4—4 of Fig. 2; and Fig. 5 is an enlarged cross-section of the mirror control gear arrangement taken on the line 5—5 of Fig. 2.

Referring to the drawings, in which like reference numerals refer to the same parts, a camera 10, for purposes of illustration shown as a television camera, is provided with a lens system 12 and is horizontally supported from a plate 14 between a double track 16. The substantially horizontal track is supported in any suitable manner and provides a runway for the camera assembly which is freely slidable along the length of the track. In this manner, the apparatus may be easily removed from the area just above the operating table, thus facilitating necessary adjustments of the camera and optical system. This feature also permits the removal of the camera apparatus from the vicinity of the operating table when it is not in use. A rod 18 is pivotally supported through the ends of a yoke 20 which is slidably supported between the ends of two members 22 extended from and rigidly attached to the camera. A light reflecting means 24, which is preferably a mirror of the highly polished plane type, is rigidly supported on the rod 18. The illuminating device 26, which may be a modification of any of the well known models presently in use in hospitals, such as the Wilmot Castle type lighting fixture, is rigidly attached to dependent supports 28 and 30. The support 28 is pivotally attached to the outer end of the rod 18, while the support 30 is rigidly attached to the outer end of a rod 32, referred to more fully hereinafter, so that the entire assembly including mirror, lamp, and camera will move as a unit when traversed along the tubular trackway.

The camera assembly is suspended from the supporting plate by means of a circular support, as shown in Fig. 4. This support consists of a grooved ring 34 which is rigidly attached to the camera support plate 14. The camera 10 is attached to a second grooved ring 36 which is rotatably mounted within the first ring 34 so that it is capable of a 360 degree rotation about a vertical axis. It should be understood, however, that normally, in televising operations, the camera will be in the position shown in the drawing, its sides being usually, but not necessarily, parallel to the trackway on which the supporting plate 14 is adapted to slide.

The electrical power cable 38 necessary for the operation of the camera may be suspended from the underside of the camera in such a manner as to prevent its interference with the movement of the camera. If desired, a stop may be placed on the ring 34 such as to prevent the camera from turning through more than one complete revolution and thereby eliminating any tendency for the power cables to twist due to excessive rotation of the camera assembly.

It is obvious that an uninterrupted optical path must exist from the object, which is normally directly below the illuminating device 26 to the lens system 12 of the camera. To attain this object in the particular embodiment herein described, a hole or port 40 is located at the center of the illuminating device so that an image of the illuminated object will be transmitted to the mirror 24 and thence reflected to the lens 12. However, I realize that this optical path need not be limited to a simple hole or port and may take one of a number of other forms, such as an opening with a transparent cover, or any other suitable means which provides an optical path through the lamp.

The illuminating device 26 is pivotally attached to the yoke 20 by means of the rods 18 and 32 which are supported in bearings between the ends of the yoke 20. By this arrangement, the source of illumination is capable of being easily tilted about the rods 18 and 32 as an axis. As the surgeon operates, he will, in the course of his work, necessarily have to adjust the lamp by tilting in order that the maximum amount of light be played on the particular area on which he is operating. During the normal operation, this must be done at frequent intervals and very often quickly and without notice. The difficulties involved in trying to adjust the mirror for each lamp adjustment are evident. In accordance with my invention, these difficulties are overcome by providing a gear train, as shown in Fig. 5, which connects the support 30 with the pivotally supported rod 18 to which the mirror 24 is rigidly attached. A gear 42 is rigidly connected to the rod 32 which is rotatably supported by the yoke 20 while a gear 44 is rigidly connected to the rod 18 which supports the mirror 24. A pair of idler gears 46 and 50 are supported in a free-running manner on shafts 48 and 54 respectively which extend inwardly from the yoke 20. Gear 44 is made twice the size of gear 42. This arrangement of gears will provide a connection between the illuminating device 26 and the mirror 24, so that a movement of the source of illumination through a given angle, A, will cause the mirror to move through half the angle, A. In this manner, the mirror will always be positioned so as to reflect the image of the object on which the lamp is directed to the lens of the camera. This structure will permit the camera to remain in a constant horizontal plane while the surgeon tilts the illuminating device in various directions. Thus, by means of a gear train integrated in the system, as the illuminating device and mirror move, the image reflected by the mirror will always impinge on the particular camera lens in use, despite the severity of the angle through which the lamp is tilted.

Additional flexibility in movement of the source of illumination is provided by the yoke 20, which is supported by two roller bearings 50 attached to the ends of members 22. This arrangement will permit the lamp and reflecting device assembly to rotate about an axis extending through the camera lens, allowing the surgeon to tilt the lamp to either side as he may desire, thus covering the entire operating table.

As will be apparent from the foregoing description, the system described herein provides an extremely simple and reliable method of insuring that every step the surgeon takes as he operates will be seen by the translating apparatus of the particular camera in use. In the case of a television camera, the information picked up by the camera may be transmitted to any point. Thus, the techniques of a surgeon operating in California may be observed as readily by students in the next room or in New York as by those standing at the side of the surgeon. By using my present invention, the chances that the camera might fail to pick up parts of the operation are virtually eliminated, and an accurate step-by-step picture of the operation is a certainty.

My invention has been described as being especially adaptable for use in hospital operating rooms, yet it will be understood that its use is not so limited since it is equally useful in classrooms or even in factories where it may be desirable to show at a distant point the operation of machines or the steps taken in carrying out chemical and other processes.

Having thus described my invention, what I claim and desire to secure by Letters Patent is:

1. A projection system comprising a light sensitive device, a positionally adjustable source of illumination, and a rotatably mounted light reflecting means, said source of illumination having means whereby light may be directed in a given direction on an object from any desired angle and having an aperture providing an optical path centrally therethrough whereby light reflected from said object passes through said light directing means to said rotatably mounted light reflecting means in said optical path, said light reflecting means being located on the side of said source remote from said object, said light reflecting means being provided with coupling means including a gear train to vary its position with respect to said object and said light sensitive device whereby light may be directed from said object to said light sensitive device.

2. A projection system comprising a television camera, a positionally adjustable source of illumination, and a rotatably mounted light reflecting means, said source of illumination having means including an aperture whereby light may be directed on an object from any desired angle and having an optical path provided centrally therethrough, said reflecting means being located in said optical path on the side of said source of illumination remote from said object whereby light reflected from said object passes through said light directing means to said rotatably mounted light reflecting means, gearing means coupling said source of illumination and said reflecting means whereby when said source of illumination is moved, said light reflecting means moves relative thereto so that light is directed from said object to said television camera.

3. A system for projecting the image of an object on a light sensitive device comprising an illuminating device for illuminating said object, reflecting means located on the side of said illuminating device remote from said object, said illuminating device having an aperture therein whereby light reflected from said object passes therethrough to said reflecting means, and gearing means coupled between said illuminating device and said reflecting means whereby when the position of said illuminating means is changed the position of said reflecting means with respect thereto is simultaneously varied so that said image is always directed to said light sensitive device.

References Cited in the file of this patent
UNITED STATES PATENTS

| | | |
|---|---|---|
| 1,277,109 | Patterson | Aug. 27, 1918 |
| 2,183,462 | Mestre | Dec. 12, 1939 |
| 2,675,462 | Newton | Apr. 13, 1954 |
| 2,758,196 | Greppin | Aug. 7, 1956 |